(12) United States Patent
Watanabe et al.

(10) Patent No.: US 7,809,196 B2
(45) Date of Patent: Oct. 5, 2010

(54) OBJECT RECOGNITION APPARATUS

(75) Inventors: Keisuke Watanabe, Mizuho (JP);
Tatsushi Ohyama, Ogaki (JP)

(73) Assignee: Sanyo Electric Co., Ltd, Moriguchi-shi (JP)

( * ) Notice: Subject to any disclaimer, the term of this patent is extended or adjusted under 35 U.S.C. 154(b) by 1028 days.

(21) Appl. No.: 11/509,061

(22) Filed: Aug. 24, 2006

(65) Prior Publication Data

US 2007/0047839 A1 Mar. 1, 2007

(30) Foreign Application Priority Data

Aug. 25, 2005 (JP) .............................. 2005-244704

(51) Int. Cl.
*G06K 9/46* (2006.01)
(52) U.S. Cl. ........................ 382/195; 382/190; 345/158
(58) Field of Classification Search ................ 382/124, 382/101, 103, 118, 181, 190, 195, 141
See application file for complete search history.

(56) References Cited

U.S. PATENT DOCUMENTS

| | | | | |
|---|---|---|---|---|
| 5,844,603 | A * | 12/1998 | Ogata .......................... | 348/155 |
| 6,108,033 | A * | 8/2000 | Ito et al. ...................... | 348/152 |
| 6,417,841 | B1 * | 7/2002 | Doi et al. ..................... | 345/158 |
| 6,788,809 | B1 * | 9/2004 | Grzeszczuk et al. ......... | 382/154 |
| 7,139,411 | B2 * | 11/2006 | Fujimura et al. ............. | 382/103 |

FOREIGN PATENT DOCUMENTS

| | | | |
|---|---|---|---|
| JP | 5-145844 | A | 6/1993 |
| JP | 9-171553 | A | 6/1997 |
| JP | 10-208045 | A | 8/1998 |
| JP | 2001-52171 | A | 2/2001 |
| JP | 2002-109513 | A | 4/2002 |
| JP | 2002-112080 | A | 4/2002 |
| JP | 2002-191045 | A | 7/2002 |
| JP | 2004-258927 | A | 9/2004 |

OTHER PUBLICATIONS

Hideyuki Tamura, "Extraction of Computer Image", Computer Image Processing, chapter 6, p. 182-191, (2002).
Office Action issued Dec. 22, 2009 in corresponding Japanese Patent Application 2005-244704.
Japanese Office Action mailing date to Mar. 16, 2010, issued in corresponding Japanese Patent Application No. 2005-244704.

* cited by examiner

*Primary Examiner*—Samir A. Ahmed
*Assistant Examiner*—Ruiping Li
(74) *Attorney, Agent, or Firm*—Westerman, Hattori, Daniels & Adrian, LLP

(57) ABSTRACT

In an object recognition apparatus, a first division unit and a second division unit each partitions an image into a plurality of regions. A first calculation and a second calculation unit each derives, for each of the plurality of regions partitioned. A first comparison unit and a second comparison unit each compares the derived characteristic quantities in between at least two images, for each of the plurality of regions. A recognition unit recognizes a region where the object is located, based on the comparison result.

10 Claims, 17 Drawing Sheets

FIG.12

A:IMAGE DATA
B:POSITION DATA
C:DISTRIBUTION OF CHARACTERISTIC QUANTITIES

550

OBJECT RECOGNITION APPARATUS

BACKGROUND OF THE INVENTION

1. Field of the Invention

The present invention relates to an object recognition technology and, more particularly, to an object recognition apparatus capable of recognizing the position of an object, such as a person or an animal.

2. Description of the Related Art

There are methods for recognizing the position of an object by extracting the difference of image data themselves between two images and recognizing the presence of an object in the part where there is change (See Reference (1) in the following Related Art List, for instance). There are also other proposed techniques of image recognition with reduced amounts of calculations (See Reference (2) in the following Related Art List, for instance). In the technique of Reference (2), a polar coordinate system with the pixels of interest as its center is taken into consideration, and the neighborhood of the pixels of interest is quantized into divided regions of the polar coordinate system. In this quantization, the regions in the angular direction are set at equal intervals, and the regions in the radial direction are set at equal intervals on a logarithmic scale. Since this method treats a large number of pixels as a mass in the regions away from the pixels of interest, it is possible to reduce the amount of calculations even when the relationship with far distances is taken into consideration.

Related Art List (1) Japanese Patent Application Laid-Open No. Hei05-145844.
(2) Japanese Patent Application Laid-Open No. Hei09-171553.

When the difference of image data themselves between two images is used as in the technique of Reference (1), a large volume of memory is required because the image data themselves must be stored. Also, the amount of calculations tends to increase because of the necessity for a heavy processing such as the removal of noise. Also, if one feature vector is derived from the whole image as in the case of Reference (2), then the position of the object cannot be recognized.

SUMMARY OF THE INVENTION

The present invention has been made in view of the foregoing circumstances, and a general purpose thereof is to provide an object recognition apparatus capable of recognizing the position of an object with a reduced amount of calculations.

In order to solve the aforementioned problems, an object recognition apparatus according to one embodiment of the present invention includes: an input unit which inputs at least two images that contain a captured position where an object is possibly present; a division unit which partitions each of the at least two images into a plurality of regions; a calculation unit which derives, for each of the plurality of regions partitioned by the division unit, a characteristic quantity of the region based on a pixel value of each pixel within the region; a comparison unit which compares the characteristic quantities derived by the calculation unit between the at least two images, for the each of the plurality of regions; and a recognition unit which recognizes a region where the object is located, based on a comparison result by the comparison unit for the each region.

An "image" contains also a thermal image, a distance image or the like. That is, it suffices if the image is an image indicative of information on a position at which an object is possibly present. A "thermal image" is an image where each pixel value indicates thermal information. A "distance image" is an image where each pixel value indicates distance information. According to this embodiment, the image information on a plurality of respective regions is expressed by characteristic quantities representing the respective regions, and the characteristic quantities are compared between the two images for each region. Thus, the position of an object can be recognized with the calculation amount smaller than in the case when the pixel values themselves are compared.

Another embodiment of the present invention relates also to an object recognition apparatus. This apparatus includes: an input unit which inputs at least two images that contain a captured position where an object is possibly present; a first division unit which partitions each of the at least two images into a plurality of first regions along a first direction; a second division unit which partitions each of the at least two images into a plurality of second regions along a second direction different from the first direction; a first calculation unit which derives, for each of the plurality of first regions partitioned by the first division unit, a first characteristic quantity of the region based on a pixel value of each pixel within the first region; a second calculation unit which derives, for each of the plurality of second regions partitioned by the second division unit, a second characteristic quantity of the region based on a pixel value of each pixel within the second region; a first comparison unit which compares the first characteristic quantities derived by the first calculation unit between the at least two images, for each of the plurality of first regions; a second comparison unit which compares the second characteristic quantities derived by the second calculation unit between the at least two images, for each of the plurality of second regions; and a recognition unit which recognizes a region where the object is located, based on a comparison result by the first comparison unit and the second comparison unit for the each first and the each second region.

According to this embodiment, the image information in each of a plurality of first regions and the image information in each of a plurality of second regions are each expressed as a characteristic quantity representing each region, and the characteristic quantities are compared between the two images for each region. Thus, the position of an object can be recognized with the calculation amount smaller than in the case when the pixel values themselves are compared. Furthermore, the characteristic quantities of the respective regions are compared between the two images along the different two directions, for each region. Thus, the position of an object can be recognized with high accuracy.

The recognition unit may include: a first identification unit which identifies from the plurality of first regions a first region where the object should be located, based on the comparison result by the first comparison unit for each of the plurality of first regions; a second identification unit which identifies from the plurality of second regions a second region where the object should be located, based on the comparison result by the second comparison unit for each of the plurality of second regions; and a third identification unit which recognizes a region where the object is located, by identifying a range in which the first region identified by the first identification unit is superposed with the second region identified by the second identification unit. In such a case, a range over which the first region and the second region are overlapped is identified, so that the region where the object is located can be accurately recognized.

The object recognition apparatus may further include a display unit which displays the image inputted by the input unit in such a manner that the region recognized by the third identification unit is superposed on the image. In this case, the visibility of an object on the display unit increases and this is convenient when an object is monitored and so forth.

The first characteristic quantity and the second characteristic quantity may be different from each other. In such a case, the advantages and disadvantages according to the types of characteristic quantities are taken into consideration and therefore the type of characteristic quantities of regions along with the respective directions can be selected as appropriate. As a result, it is possible to perform position recognition with less calculation amount and higher accuracy.

The object recognition apparatus may further include a setting unit which sets a marked-out part in a captured image, based on the region, where the object is located, recognized by the recognition unit. The division unit may partition an image inputted after the marked-out part has been set by the setting unit, in a manner such that the marked-out part set by the setting unit is partitioned narrowly and parts other than the marked-out part are partitioned widely. In this case, an region of interest can be partitioned narrowly, so that the position of an objection in the region of interest can be recognized with accuracy. Also, since a wider division is made of the parts where the object is barely present, so that the calculation amount can be reduced.

The object recognition apparatus may further include: a distance information acquisition unit which acquires distance information in the region, where the object is located, recognized by the recognition unit; and a distance identifying unit which identifies a distance of the object based on the distance information acquired by the distance information acquisition unit. The image inputted in the input unit is an distance image each pixel of which indicates distance information, and the apparatus may further include a distance identifying unit which identifies a distance of the object based on the distance information on the region recognized by the recognition unit. In this case, the distance of an object can be identified, so that the scope of application as an object recognition apparatus is extended.

The object recognition apparatus may further include a thermal information acquiring unit which acquires thermal information in the region recognized by the recognition unit, and a temperature identifying unit which identifies a temperature of the object based on the thermal information acquired by the thermal information unit. The images inputted in the input unit are thermal images where each pixel value indicates thermal information, and the apparatus may further include a temperature identifying unit which identifies the temperature of the object based on the thermal information in the region recognized in the recognition unit. In this case, since the temperature is free from the effect of brightness, it is possible to lessen the effect due to the difference in brightness of the place where an object possibly exists.

The object recognition apparatus may further include a posture identifying unit which identifies the posture of the object based on the region recognized in the recognition unit and the distance identified by the distance identifying unit. The object recognition apparatus may further include a posture identifying unit which identifies the posture of the object based on the region recognized in the recognition unit and the temperature identified by the temperature identifying unit. In such cases, the posture of an object can be identified, so that the scope of application as an object recognition apparatus is extended.

Still another embodiment of the present invention relates to an image processing apparatus. This apparatus includes: an input unit which sequentially inputs an image where a position at which an object is possibly present is captured; a position identifying unit which identifies a region where the object is located in the image inputted in the input unit; a coding unit which codes data of the image inputted in the input unit; a generation unit which generates a stream that contains the image data coded in the coding unit and data on the region, where the object is located, identified by the position identifying unit.

According to this embodiment, the streams generated contain the image data and the position data, so that it is possible to have a stream reproducing apparatus extract easily an object within an image. Thus it is possible to have the stream reproducing apparatus identify the appearance scene of an object or the locus of movement of an object.

The position identifying unit may include: a division unit which partitions each of the at least two images inputted in the input unit, into a plurality of regions; a calculation unit which derives, for each of the plurality of regions partitioned by the division unit, a characteristic quantity of the region based on a pixel value of each pixel within the region; a comparison unit which compares the characteristic quantities derived by the calculation unit between the at least two images, for the each of the plurality of regions; and a recognition unit which recognizes a region where the object is located, based on a comparison result by the comparison unit for the each region. In this case, the position of an object can be recognized with a small amount of calculation and therefore the image processing can be done at high speed.

Still another embodiment of the present invention relates also to an image processing apparatus. This apparatus includes: an input unit which inputs sequentially an image that contain a position where an object is possibly present is captured; a first division unit which partitions each image inputted in the input unit, into a plurality of first regions along a first direction; a second division unit which partitions each image inputted by the input unit, into a plurality of second regions along a second direction different from the first direction; a first calculation unit which derives, for each of the plurality of first regions partitioned by the first division unit, a first characteristic quantity of the region based on a pixel value of each pixel within the first region; a second calculation unit which derives, for each of the plurality of second regions partitioned by the second division unit, a second characteristic quantity of the region based on a pixel value of each pixel within the second region; a first comparison unit which compares the first characteristic quantities derived by the first calculation unit between at least two images, for each of the plurality of first regions; a second comparison unit which compares the second characteristic quantities derived by the second calculation unit between the at least two images, for each of the plurality of second regions; a recognition unit which recognizes a region where the object is located, based on a comparison result by the first comparison unit and the second comparison unit for the each first and the each second region; a coding unit which codes data of the image inputted in the input unit; and a generation unit which generates a stream that contains the image data coded in the coding unit and data on the region, where the object is located, recognized by the recognition unit.

The recognition unit may include: a first identification unit which identifies from the plurality of first regions a first region where the object should be located, based on the comparison result by the first comparison unit for each of the plurality of first regions; a second identification unit which identifies from the plurality of second regions a second region where the object should be located, based on the comparison result by the second comparison unit for each of the plurality of first regions; and a third identification unit which recognizes a region where the object is located, by identifying a range in which the first region identified by the first identification unit is superposed with the second region identified by the second identification unit. The image processing apparatus may further include a display unit which displays the image inputted by the input unit in such a manner that the region recognized by the third identification unit is superposed on the image. The first characteristic quantity and the second characteristic quantity may be different from each other. The image processing unit may further include a setting unit which sets a marked-out part in a captured image, based on the region, where the object is located, recognized by the recognition unit. The partition unit may partition an image set after the marked-out part has been set by the setting unit, in a manner such that the marked-out part set by the setting unit is partitioned narrowly and parts other than the marked-out part are partitioned widely. The image inputted in the input unit is an distance image each pixel of which indicates distance information, and the apparatus may further include a distance identifying unit which identifies a distance of the object based on the distance information on the region recognized by the recognition unit. Also, the image inputted in the input unit may be a thermal image each pixel value of which indicates thermal information.

Still another embodiment of the present invention relates to a method for recognizing an object. This method includes: dividing a first image that contains a captured position where an object is possibly present, into a plurality of regions; deriving, for each of the plurality of regions divided by the dividing, a characteristic quantity of the region based on a pixel value of each pixel within the region; dividing a second image that contains a captured position where an object is possibly present, into a plurality of regions wherein the second image is captured at an interval of time from the first image; deriving, for each of the plurality of regions divided by the dividing, a characteristic quantity of the region based on a pixel value of each pixel within the region; comparing the characteristic quantities in the first image and the second image, for the each of the plurality of regions; recognizing a region where the object is located, based on a comparison result for the each region in the comparing.

According to this embodiment, the image information on a plurality of respective regions is expressed by characteristic quantities representing the respective regions, and the characteristic quantities are compared between two images for each region. Thus, the position of an object can be recognized with the calculation amount smaller than in the case when the pixel values themselves are compared.

Still another embodiment of the present invention relates also to a method for recognizing an object. This method includes: dividing a first image that contains a captured position where an object is possibly present, into a plurality of regions along a first direction; deriving, for each of the plurality of regions divided by the dividing along the first direction, a characteristic quantity of the region based on a pixel value of each pixel within the region; dividing a second image that contains a captured position where an object is possibly present, into a plurality of regions along a second direction different from the first direction; deriving, for each of the plurality of regions divided by the dividing along the second direction, a characteristic quantity of the region based on a pixel value of each pixel within the region; dividing a second image that contains a captured position where an object is possibly present, into a plurality of regions wherein the second image is captured at an interval of time from the first image; deriving, for each of the plurality of regions divided by the dividing along the first direction, a characteristic quantity of the region based on a pixel value of each pixel within the region; comparing the characteristic quantities in the first image and the second image along the first direction, for the each of the plurality of regions and comparing the characteristic quantities in the first image and the second image along the second direction, for the each of the plurality of regions; recognizing a region where the object is located, based on a comparison result for the each region in the comparing.

According to this embodiment, the image information in each of a plurality of first regions and the image information in each of a plurality of second regions are each expressed as a characteristic quantity representing each region, and the characteristic quantities are compared between two images for each region. Thus, the position of an object can be recognized with the calculation amount smaller than in the case when the pixel values themselves are compared. Furthermore, the characteristic quantities of the respective regions are compared between the two images along the different two directions, for each region. Thus, the position of an object can be recognized with high accuracy.

It is to be noted that any arbitrary combination of the above-described structural components as well as the expressions according to the present invention changed among a method, an apparatus, a system, a computer program, a recording medium and so forth are all effective as and encompassed by the present embodiments.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 12 illustrates an arrangement of streams generated by the generation unit of FIG. 11;

DETAILED DESCRIPTION OF THE INVENTION

The invention will now be described based on the following embodiments which do not intend to limit the scope of the present invention but exemplify the invention.

An outline will be given of the present invention below before it is described in detail. A preferred embodiment of the present invention relates to an object recognition apparatus capable of recognizing the position of an object, such as a person or an animal, based on an image thereof taken by an image pickup device, such as a camera provided on the ceiling of a room, as the object enters or exits it. An example of the object is a moving body, such as a person or an animal. In the present embodiment, the images taken consecutively by an image pickup device are each divided into regions along two or more different directions. For each of the divided regions, a characteristic quantity is derived based on the pixel values of the pixels within the region. This derivation processing compresses the image information as a characteristic quantity in each of the divided regions, thereby reducing the amount of information. The characteristic quantities thus derived are compared with each other in each of the regions between two images taken with an interval of time. Here, the compressed characteristic quantities themselves are compared, so that the amount of calculations for the comparison is reduced. Thus the position of an object is recognized based on the results of the comparison. The position recognition can be done at high speed because the comparison is made by a smaller amount of calculations.

Figure 1:
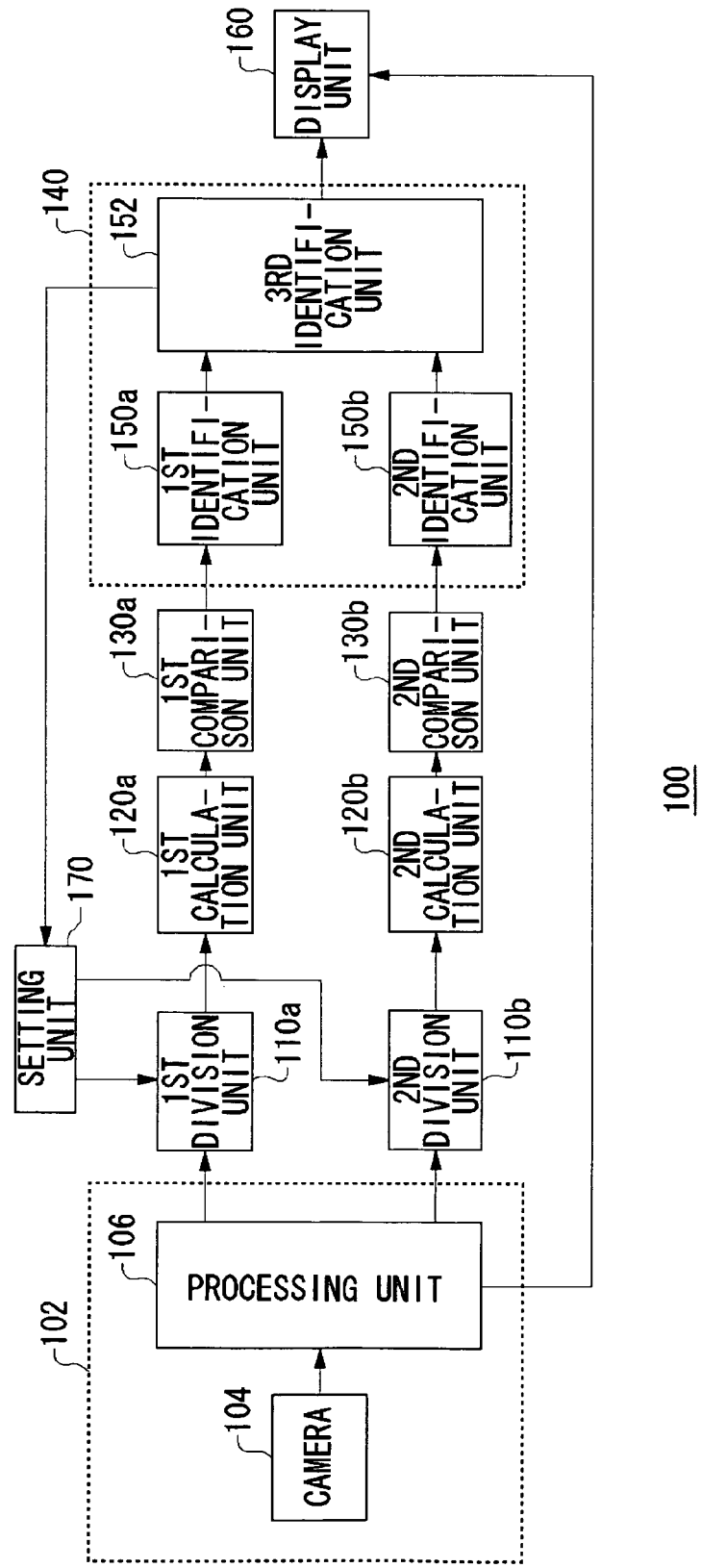
FIG. 1 illustrates a structure of an object recognition apparatus according to an embodiment of the present invention.

FIG. 1 illustrates an object recognition apparatus 100 according to an embodiment of the present invention. In terms of hardware, each block shown here can be realized by various devices such as processors, RAMs and sensors. In terms of software, it is realized by computer programs and the like, but drawn and described herein are function blocks that are realized in cooperation with those. Thus, it is understood by those skilled in the art that these function blocks can be realized in a variety of forms such as by hardware only, software only or the combination thereof.

The object recognition apparatus 100 includes an image pickup unit 102, a first division unit 110a, a second division unit 110b, a first calculation unit 120a, a second calculation unit 120b, a first comparison unit 130a, a second comparison unit 130b, a recognition unit 140, a display unit 160, and a setting unit 170. The image pickup unit 102 includes a camera 104 and a processing unit 106. The recognition unit 140 includes a first identification unit 150a, a second identification unit 150b, and a third identification unit 152.

The camera 104 sequentially takes images of the place where an object can exist and converts the images taken into electrical signals. The processing unit 106 digitizes the signals converted by the camera 104 into binary or 256-value data, for instance. Where binary data are to be used, any distance within a predetermined threshold value is, for example, decided to be black, and any distance farther than the predetermined threshold value to be white, and black is represented by 0 or 1, and white by 1 or 0. The first division unit 110a divides each of the images digitized by the processing unit 106 into a plurality of first regions along a first direction. The second division unit 110b divides each of the images digitized by the processing unit 106 into a plurality of second regions along a second direction, which is different from the first direction.

Figure 2:
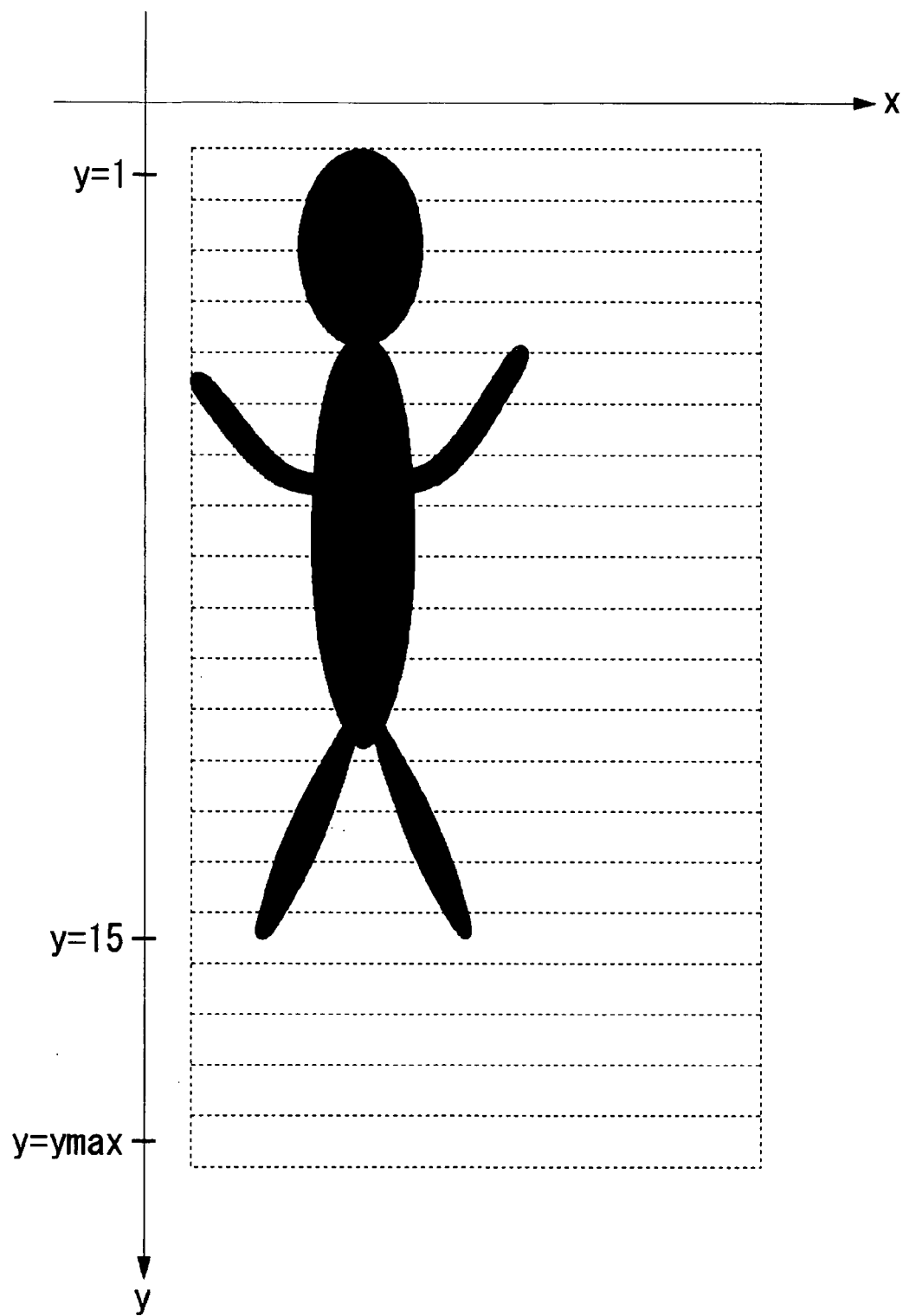
FIG. 2 shows an image taken by the camera in FIG. 1 overlapping a plurality of first regions divided by a first division unit.
Figure 3:
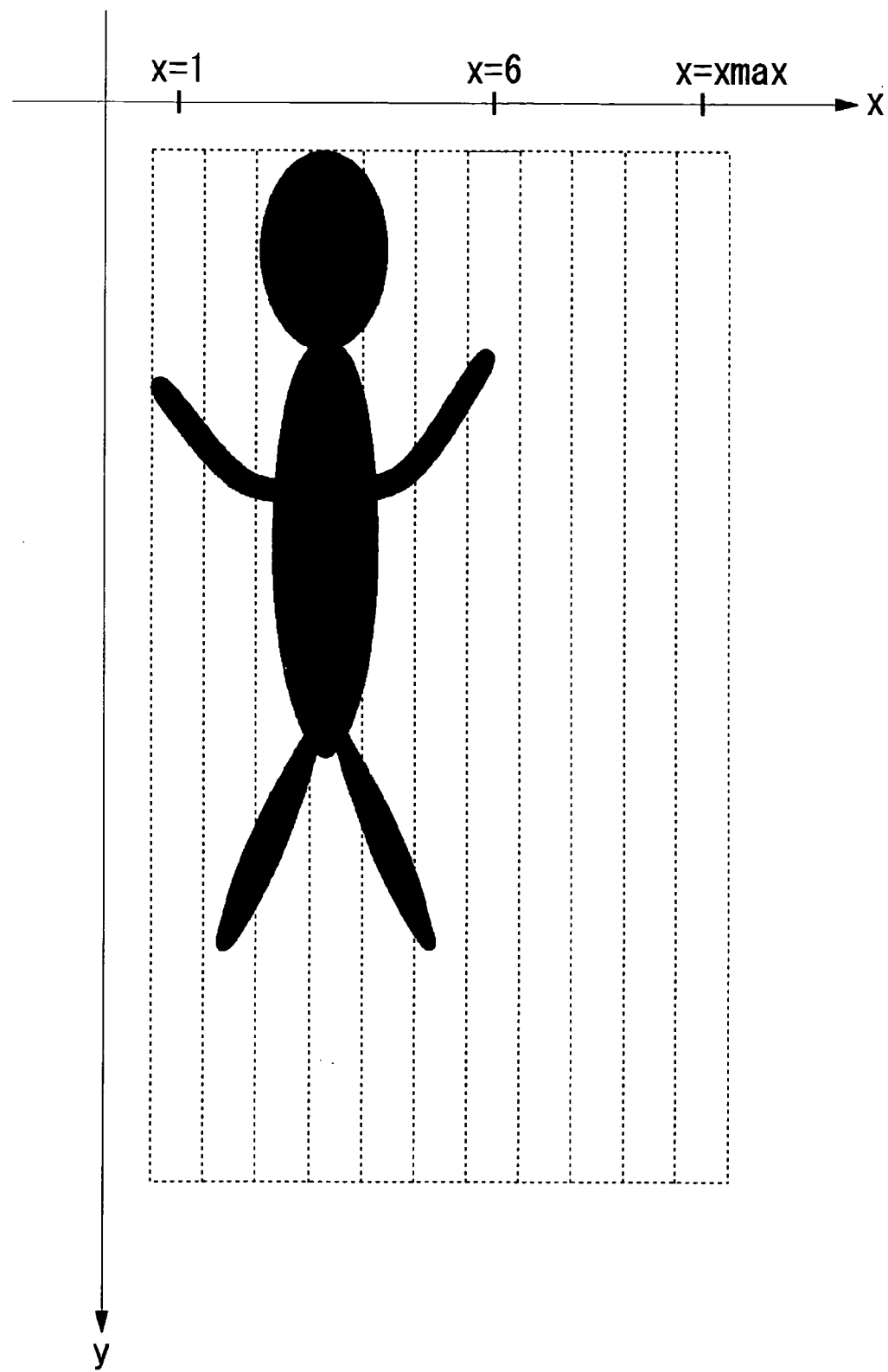
FIG. 3 shows an image taken by the camera in FIG. 1 overlapping a plurality of second regions divided by a second division unit.

FIG. 2 shows an image taken by a camera 104 in FIG. 1 overlapping a plurality of first regions divided by a first division unit 110a. FIG. 3 shows the same image taken by the camera 104 in FIG. 1 overlapping a plurality of second regions divided by a second division unit 110b. In FIG. 2 and FIG. 3, the x axis corresponds to the first direction, and the y axis the second direction. The x axis and the y axis intersect each other at right angles, and any arbitrary pixel within the image can be identified by its position on the x axis and its position on the y axis. Note that, for the simplicity of explanation, a person, as the object, alone is represented by black and the other parts by white, but, in fact, a variety of images may be obtained depending on the place picked up by the camera. In FIG. 2, the plurality of regions shown by broken lines are the first regions. Hereinbelow, the total number of the first regions is assumed to be ymax. In the range of $1 \leq y \leq ymax$, a single y coordinate represents each of the plurality of the first regions. In FIG. 3, the plurality of regions shown by broken lines are the second regions. Hereinbelow, the total number of the second regions is assumed to be xmax. In the range of $1 \leq x \leq xmax$, a single x coordinate represents each of the plurality of the second regions. Now, reference is made back to FIG. 1.

For each of the plurality of first regions divided by the first division unit 110a, the first calculation unit 120a derives a first characteristic quantity of the region based on the pixel values of the respective pixels therein by a calculation to be described later. For each of the plurality of second regions divided by the second division unit 110b, the second calculation unit 120b derives a second characteristic quantity of the region based on the pixel values of the respective pixels therein by a calculation to be described later. Hereinbelow, calculations at the first calculation unit 120a and the second calculation unit 120b will be described.

First, the first calculation unit 120a and the second calculation unit 120b calculate the gradient of each pixel. As a method for calculating the gradient, the method described in the literature "Tamura, Hideyuki, Ed., *Computer Image Processing*, pp. 182-191, Ohmsha, Ltd." can be used. Hereinbelow, the method will be briefly described. In order to calculate the gradients for digital images to be treated, it is necessary to calculate first-order partial differential equations both in the x direction and y direction.

$$\Delta_x f(i,j) = \{f(i+1,j) - f(i-1,j)\}/2 \quad (1)$$

$$\Delta_y f(i,j) = \{f(i,j+1) - f(i,j-1)\}/2 \quad (2)$$

In a difference operator for digital images, the derivative values at a pixel (i, j) is defined by the linear combination of gray values of 3×3 neighboring pixels with the center at (i, j), namely, $f(i \pm 1, j \pm 1)$. This means that the calculation to obtain derivatives of images can be realized by the spatial filtering using a 3×3 weighting matrix. Various types of difference operators can be represented by 3×3 weighting matrices. In the following(3), considered are 3×3 neighbors with the center at (i, j).

$$f(i-1,j-1)\ f(i,j-1)\ f(i+1,j-1)$$

$$f(i-1,j)\ f(i,j)\ f(i+1,j)$$

$$f(i-1,j+1)\ f(i,j+1)\ f(i+1,j+1) \quad (3)$$

The difference operator can be described by a weighting matrix for the above (3).

For example, the first-order partial differential operators, in the x and y directions, defined in Equations (1) and (2) are expressed by following matrices (4).

$$\begin{pmatrix} 0 & 0 & 0 \\ -1/2 & 0 & 1/2 \\ 0 & 0 & 0 \end{pmatrix} \text{ and } \begin{pmatrix} 0 & -1/2 & 0 \\ 0 & 0 & 0 \\ 0 & 1/2 & 0 \end{pmatrix} \quad (4)$$

That is, in a rectangular area represented by (3) and (4) of 3×3, the pixel values are multiplied by matrix element values for the corresponding positions, respectively, and the summation thereof is calculated, which in turn will coincide with the right-hand sides of Equations (1) and (2).

The magnitude and the direction of a gradient are obtained as the following Equations (5) and (6), respectively, after the gradient is subjected to the spatial filtering by the weighting matrix of Equation (4) and calculating partial differentials defined in the Equations (1) and (2) in the x and y directions.

$$|\nabla f(i,j)| = \sqrt{\Delta_x f(i,j)^2 + \Delta_y f(i,j)^2} \quad (5)$$

$$\theta = \tan^{-1}\{\Delta_y f(i,j)/\Delta_x f(i,j)\} \quad (6)$$

The Roberts operator, Prewitt operator, Sobel operator or the like is available as the above-mentioned difference operator. The gradients and so forth can be calculated in a simplified manner using such a difference operator and, anti-noise measures can also be taken.

Then the first calculation unit 120a and the second calculation unit 120b obtain a pair of values composed of an x component and a y component such that the direction obtained in Equation (6), namely, the angle of a gradient vector is doubled. The reason for carrying out this processing is as follows. The gradient vectors at points where the boundary lines of gradation levels (hereinafter referred to simply as "boundary lines") face the same direction have directions different by 180 degrees, depending on the gradation levels before and after the boundary lines. Accordingly, if the gradient vectors of the respective pixels within each linear region are added together, then the gradient vectors at points where the boundary lines face the same direction will cancel each other out. Therefore, if the gradient vectors are rotated such that the angle of the gradient vectors to the coordinate axis doubles and a set of numerical values composed of an x component and a y component is obtained, it is possible to express the gradient vectors at points where the boundary lines face the same direction by a unique set of numerical values having the same components. For example, 45° and 225° are exactly opposite directions, but, when doubled, they will be 90° and 450°, which represent a unique and identical direction. Here, a set of numerical values composed of an x component and a y component is a gradient vector rotated by a certain rule in a certain coordinate system. Hereinbelow in this specification, this set of numerical values is referred to as "converted values". Once these converted values are obtained, it is possible, for instance, to add up the gradient vectors of the respective pixels within each of the linear regions using a processing to be described later.

The first calculation unit 120a derives a value by adding up the converted values obtained for the respective pixels in each of the first regions (hereinafter referred to as a "first characteristic value"). Hereinbelow, an arbitrary first characteristic value is denoted by V1(y). For example, V1(1) means the first characteristic value at y=1 in FIG. 2. The first characteristic value V1(y) can be obtained by the following equations for instance.

$$V1x(y) = Ax(0,y) + Ax(1,y) + Ax(2,y) + \ldots + Ax(xmax,y) \quad (7)$$

$$V1y(y) = Ay(0,y) + Ay(1,y) + Ay(2,y) + \ldots + Ay(xmax,y) \quad (8)$$

Here, V1x(y) and V1y(y) represent the x component and the y component of a first characteristic value V1(y), respectively. Ax(x,y) and Ay(x,y) represent the x component and the y component of converted values at coordinates (x,y), respectively. It is to be noted that the first characteristic value V1(y) may be derived not simply by addition as described above but also by such other calculation as multiplication or averaging.

A derived first characteristic value V1(y) corresponds to the first characteristic quantity in each of the first regions. This first characteristic quantity is such a value as represents an accumulation of the directions of boundary lines in the first region, and one each of the first characteristic quantity is defined for each region. Accordingly, for an arbitrary y coordinate, a first characteristic quantity of a first region corresponding to the y coordinate, namely, a first characteristic value V1(y) and the x component and y component thereof, is defined. That is, a first characteristic value V1(y) and the x component and y component thereof are each given as a function of y. In this manner, the image information of each first region is compressed as a first characteristic value V1(y) or the x component and y component thereof, which is given as information concerning the y axis.

The first calculation unit 120a derives the distribution of the x component and y component of a first characteristic value V1(y) which is given as a function of y.

Similarly, the second calculation unit 120b derives a value by adding up the converted values obtained for the respective pixels in each of the second regions (hereinafter referred to as a "second characteristic value"). Hereinbelow, an arbitrary second characteristic value is denoted by V2(x). The second characteristic value V2(x) can be obtained by the following equations (9) an (10) for instance.

$$V2x(x) = Ax(x,0) + Ax(x,1) + Ax(x,2) + \ldots + Ax(x,ymax) \quad (9)$$

$$V2y(x) = Ay(x,0) + Ay(x,1) + Ay(x,2) + \ldots + Ay(x,ymax) \quad (10)$$

Here, V2x(x) and V2y(x) represent the x component and the y component of a second characteristic value V2x), respectively. It is to be noted that the second characteristic value V2(x) may be derived not simply by addition as described above but also by such other calculation as multiplication or averaging. A derived second characteristic value V2(x) also has characteristics similar to those of the above-described first characteristic value. The second calculation unit 120b derives the distribution of the x component and y component of a second characteristic value V2(x) which is given as a function of x.

Figure 4:
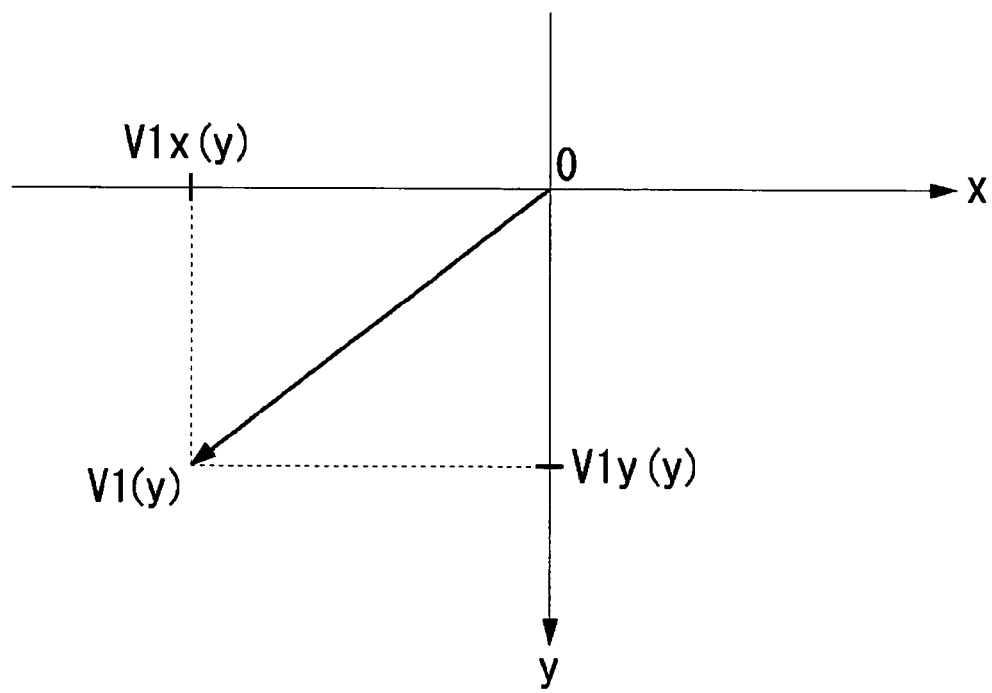
FIG. 4 shows an example of first characteristic values $V1(y)$ derived for an image illustrated in FIG. 2.
Figure 5:
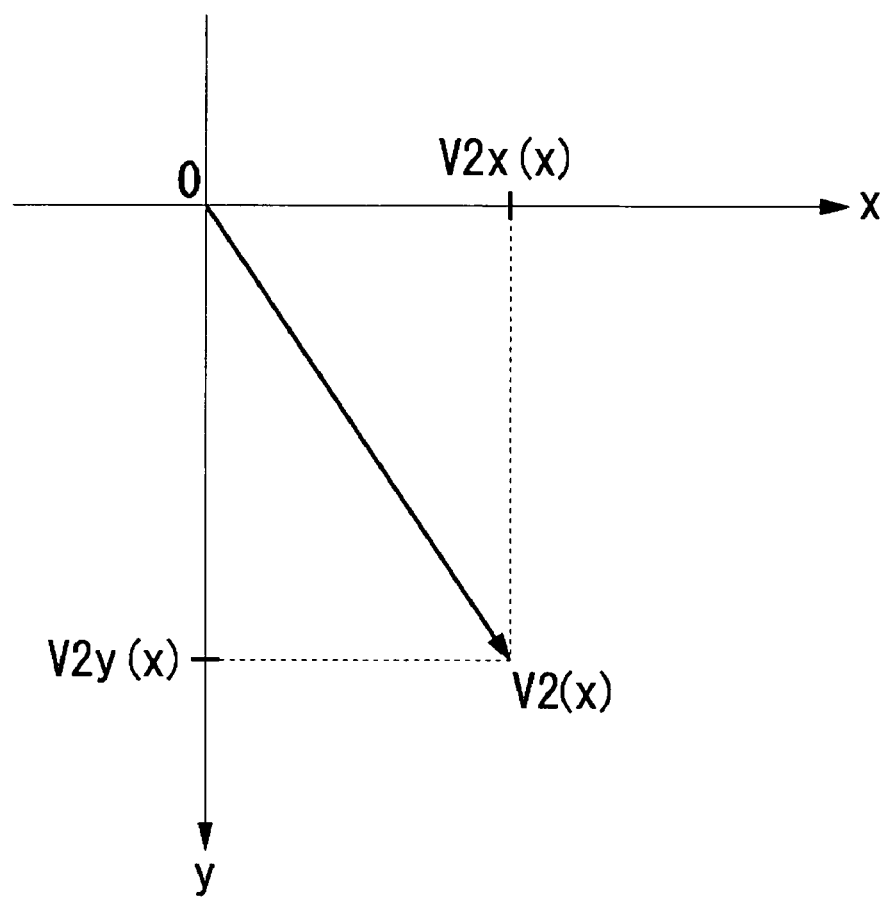
FIG. 5 shows an example of second characteristic values $V2(x)$ derived for an image illustrated in FIG. 3.

FIG. 4 shows an example of first characteristic values V1(y) derived for the image illustrated in FIG. 2. As mentioned above, V1x(y) and V1y(y) denote the x component and the y component of the first characteristic value V1(y), respectively. For each of the first regions corresponding to each y coordinate of $1 \leq y \leq ymax$ as shown in FIG. 2, first characteristic values $V1(y)$ as shown in FIG. 4 are derived. FIG. 5 shows an example of second characteristic values $V2(x)$ derived for the image illustrated in FIG. 3. As mentioned above, $V2x(x)$ and $V2y(x)$ denote the x component and the y component of the second characteristic value $V2(x)$, respectively. For each of the second regions corresponding to each x coordinate of $1 \leq x \leq xmax$ as shown in FIG. 3, second characteristic values $V2(x)$ as shown in FIG. 5 are derived.

Figure 6:
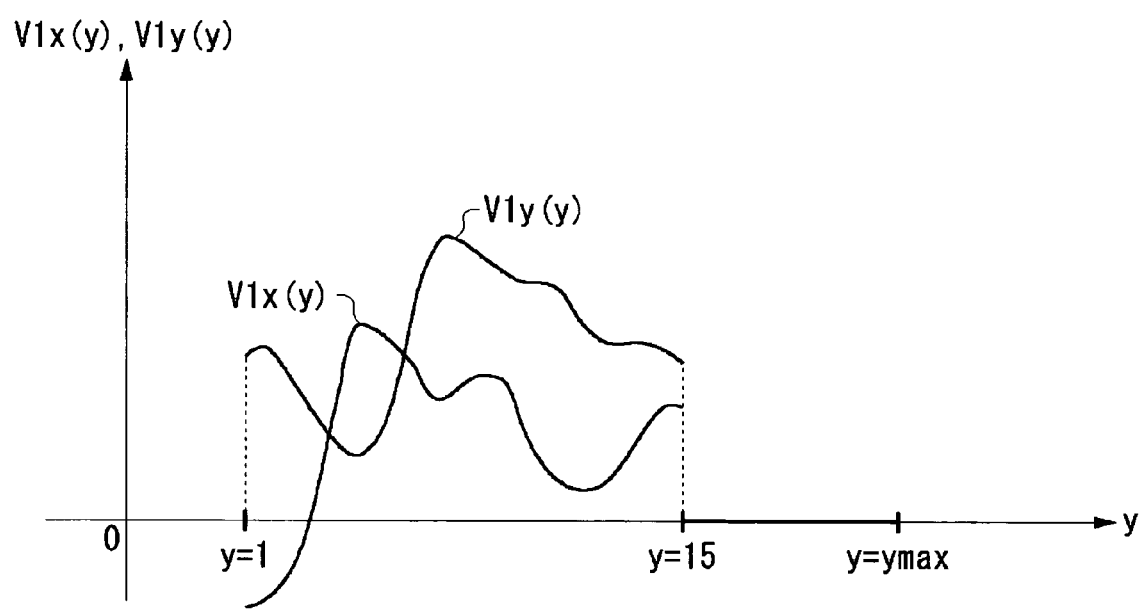
FIG. 6 illustrates the distributions of x component and y component of first characteristic values $V1(y)$ derived for the image shown in FIG. 2.
Figure 7:
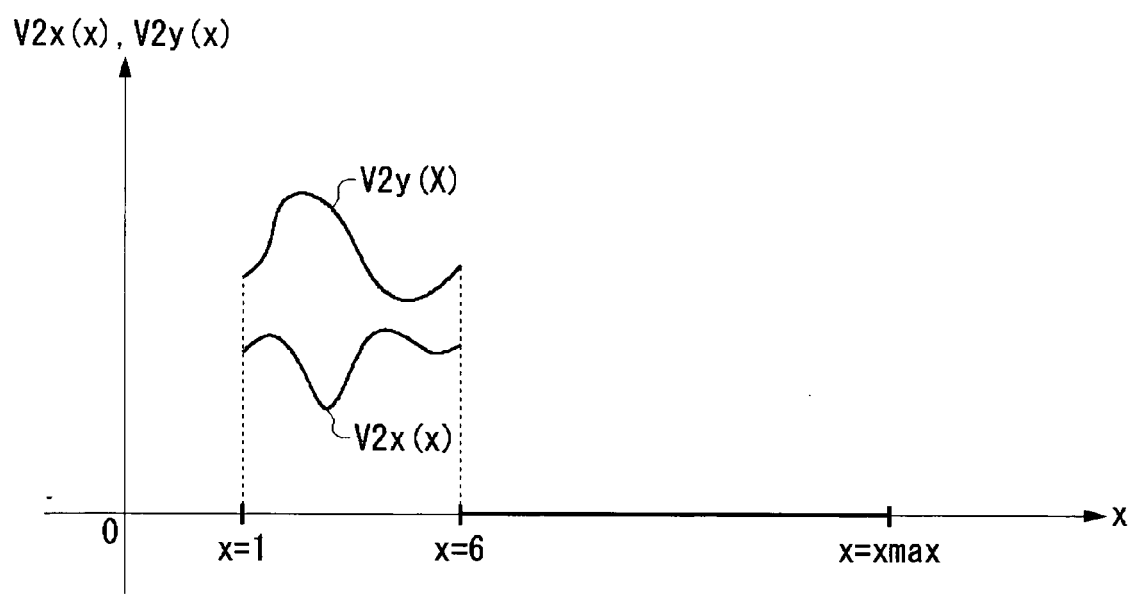
FIG. 7 illustrates the distributions of x component and y component of second characteristic values $V2(x)$ derived for the image shown in FIG. 3.

FIG. 6 illustrates the distributions of x component and y component of first characteristic values $V1(y)$ derived for the image shown in FIG. 2. FIG. 7 illustrates the distributions of the x component and the y component of second characteristic values $V2(x)$ derived for the image shown in FIG. 3. Hereinbelow, these distributions are referred to as "characteristic quantity distributions" as necessary. In FIG. 6, where y>15, the x component and y component of the first characteristic values have no values. This is because, as shown in FIG. 2, the first regions where y>15 are all white without any change in the pixel values. It is for the same reason that in FIG. 7, the x component and y component of the second characteristic values have no values where x>6. Now, reference is made back to FIG. 1.

The first comparison unit 130a compares the distributions of the x component $V1x(y)$ and the y component $V1y(y)$ of first characteristic values $V1(y)$ derived by the first calculation unit 120a, between two images with a time interval for each region. More specifically, a difference, for instance, is derived. Hereinbelow, this difference is referred to as a "first difference". The second comparison unit 130b compares the distributions of the x component $V2x(x)$ and the y component $V2y(x)$ of second characteristic values $V2(x)$ derived by the second calculation unit 120b, between two images with a time interval for each region. More specifically, a difference, for instance, is derived. Hereinbelow, this difference is referred to as a "second difference".

Figure 8:
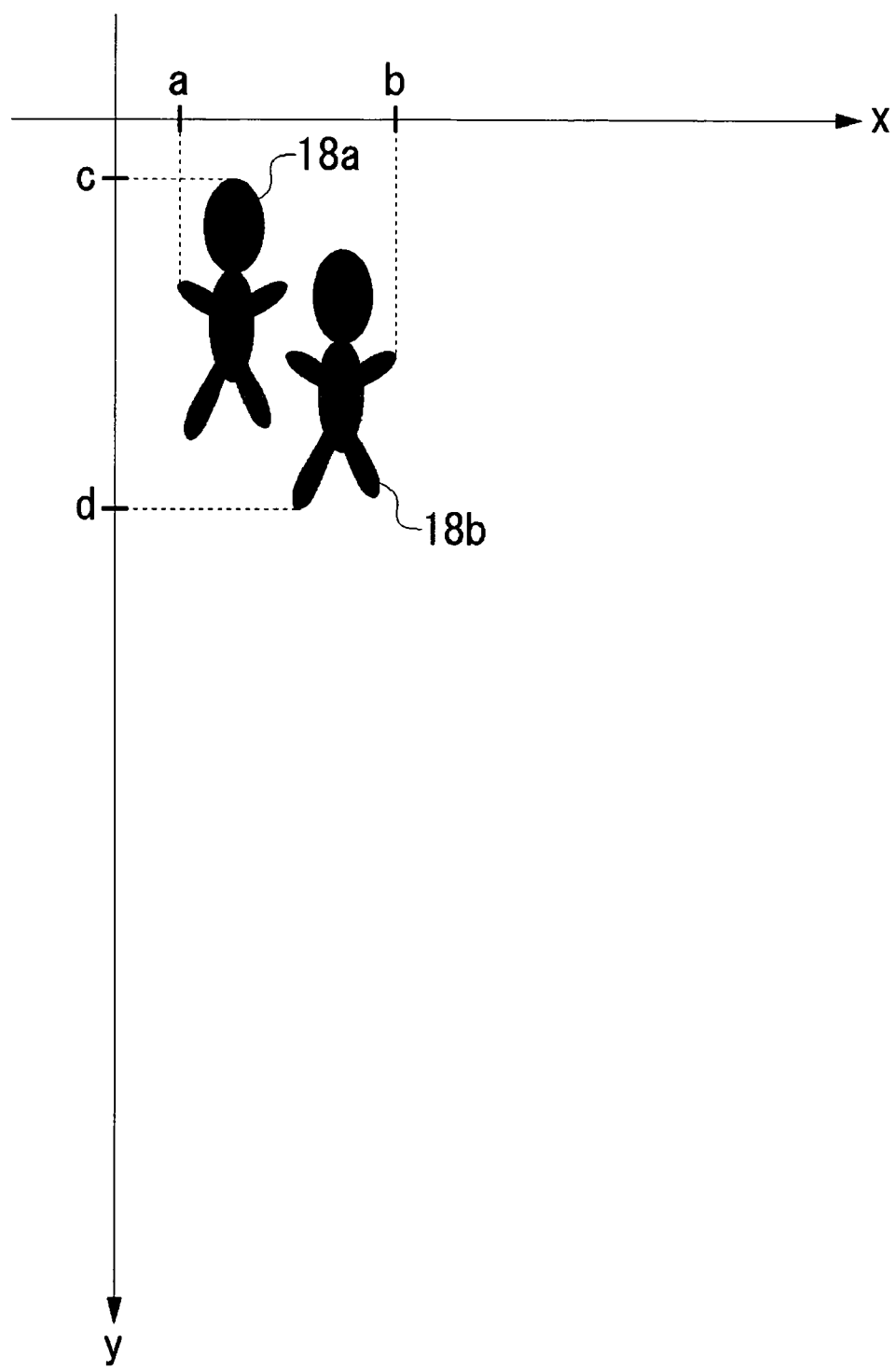
FIG. 8 illustrates two images together, which have been taken by a camera of FIG. 1 with an interval of time $\Delta t$.

FIG. 8 illustrates two images together, which have been taken by a camera 104 of FIG. 1 with an interval of time Δt. A person 18a and a person 18b are the same object, but the images have been taken at different times. In other words, the position of the person 18b is the position of the person 18a after time Δt. When the object has moved like this, the first difference takes a value other than zero in the range of $c \leq y \leq d$. The second difference takes a value other than zero in the range of $a \leq x \leq b$. Again, reference is made back to FIG. 1.

The first identification unit 150a identifies from a plurality of first regions a first region where the object must be located, based on the distribution of a first difference derived by the comparison made by the first comparison unit 130a. More specifically, the first regions in the range of $c \leq y \leq d$, where the first differences have values other than zero, in FIG. 8 are identified as the first regions where the object is located. The second identification unit 150b identifies from a plurality of second regions, a second region where the object must be located, based on the distribution of second differences derived by the comparison made by the second comparison unit 130b. More specifically, the second regions in the range of $a \leq x \leq b$, where the second differences have values other than zero, in FIG. 8 are identified as the second regions where the object is located. The third identification unit 152 recognizes the regions where the object is located by identifying the regions where the first regions identified by the first identification unit 150a and the second regions identified by the second identification unit 150b overlap each other (hereinafter referred to as "overlapping regions"). More specifically, overlapping regions defined by $a \leq x \leq b$ and $c \leq y \leq d$ in FIG. 8 are identified, and the regions are recognized as the regions where the object is located.

Figure 9A:
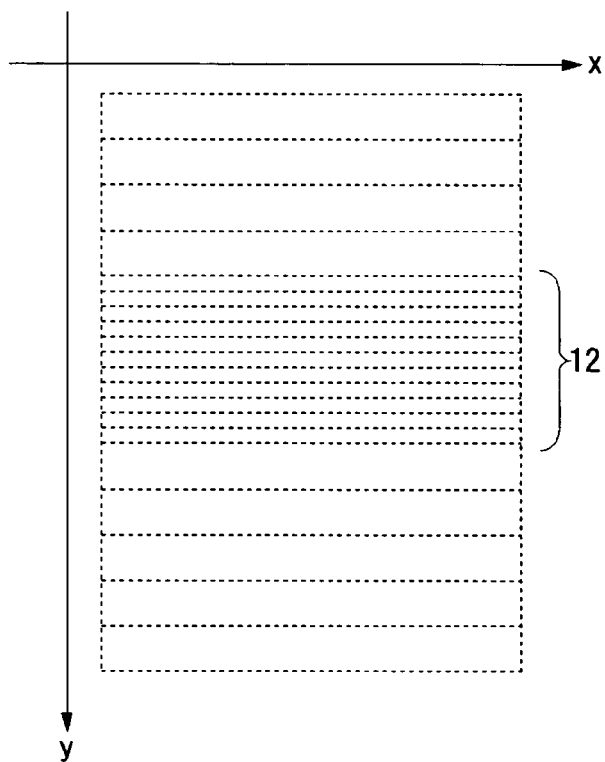
FIGS. 9A and 9B illustrate division widths of an image for a part of interest set by the setting unit of FIG. 1 and the other parts thereof.
Figure 9B:
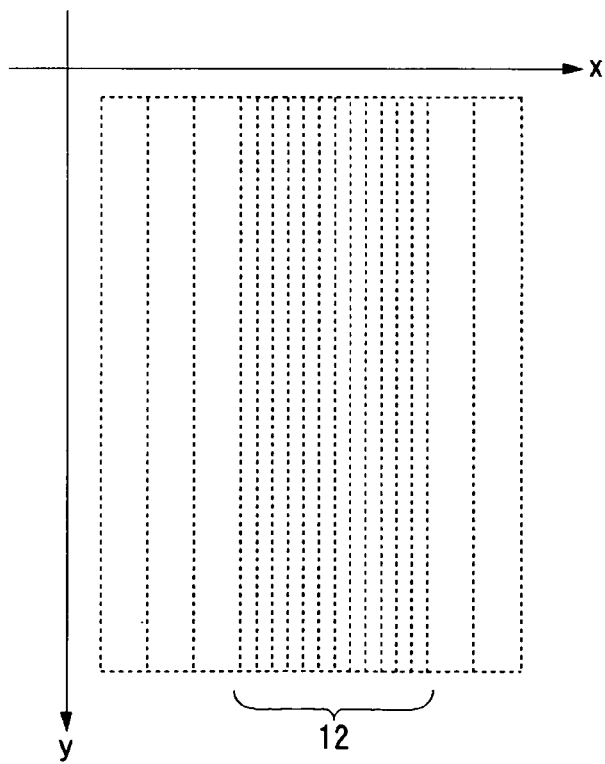

The setting unit 170 accumulates a predefined amount of information on overlapping regions identified by the third identification unit 152 and sets a marked-out part (hereinafter referred to as "part of interest" also) in the images taken based on the accumulated information. For example, regions where the object is frequently located are identified for each of the x axis direction and the y axis direction, and the regions thus identified are set as a marked-out part. The information on the thus set marked-out part is inputted to the first division unit 110a and the second division unit 110b. That is, the regions where the object is frequently located in the y axis direction are inputted to the first division unit 110a as the marked-out part in the y axis direction, whereas the regions where the object is frequently located in the x axis direction are inputted to the second division unit 110b as the marked-out part in the x axis direction. In a case where a marked-out part or part of interest is already known, for instance, the information on the part of interest may be inputted from a not-shown input unit to the setting unit 170 or to the first division unit 110a and the second division unit 110b. FIGS. 9A and 9B illustrate the division widths of an image for the part of interest 12 set by the setting unit 170 of FIG. 1 and the other parts thereof. After the input of information on a part of interest 12 from the setting unit 170, the first division unit 110a and the second division unit 110b narrow the division width for the part of interest 12 in the image taken and widen it for parts other than the part of interest 12. Note also that the division width may be widened in stages from the part of interest 12 into the other part. Reference is made back to FIG. 1.

The display unit 160 displays an image digitized by the processing unit 106 overlapping with the overlapping regions recognized by the third identification unit 152. More specifically, an image taken is displayed in such a manner that it is clarified by delineating the regions where the object is located with lines.

Figure 10:
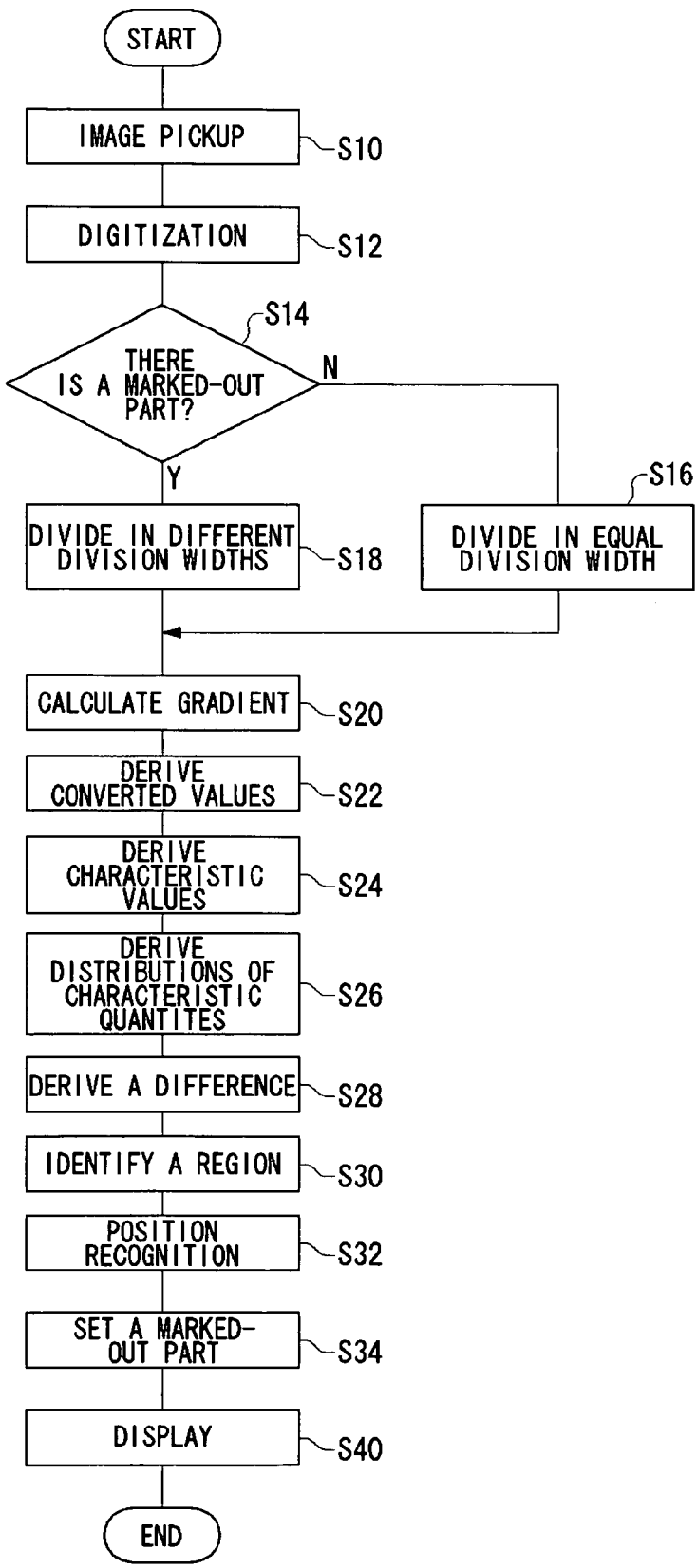
FIG. 10 is a flowchart showing an operation of an object recognition apparatus of FIG. 1.

A description will now be given of an operation of an object recognition apparatus 100 implementing the structure as described above. FIG. 10 is a flowchart showing an operation of an object recognition apparatus 100 of FIG. 1. The camera 104 takes images successively of the place where an object can exist and converts the picked-up image into electrical signals (S10). The processing unit 106 digitizes the signals (S12). The first division unit 110a and the second division unit 110b decides whether there is an input of information on a part of interest from the setting unit 170 or not (S14). When there is no input of information on a part of interest, the first division unit 110a partitions the digitized image into a plurality of first regions along the first direction, whereas the second division unit 110b partitions the digitized image into a plurality of second regions along the second direction (S16). When there is an input of information on a part of interest, the first division unit 110a and the second division unit 110b partition the image into a plurality of first regions and a plurality of second regions, respectively, but in such a manner that a narrower division is made of the part of interest and a wider division of the parts other than the part of interest (S18).

The first calculation unit 120a and the second calculation unit 120b calculate the gradient of each pixel (S20). Then they obtain converted values, which are a set of numerical values derived by doubling the calculated angles of the gradients (S22). The first calculation unit 120a and the second calculation unit 120b derive a first characteristic value $V1(y)$ and a second characteristic value $V2(x)$, respectively, by adding up the converted values of each pixel value, for each of the partitioned first regions and second regions (S24). Then the first calculation unit 120*a* and the second calculation unit 120*b* derive the distributions of the x component V1$x(y)$ and y component V1$y(y)$ of the first characteristic values V1$(y)$ and the distributions of the x component V2$x(x)$ and y component V2$y(x)$ of the second characteristic values V2$(x)$ which is given as a function of x (S26).

The first comparison unit 130*a* and the second comparison unit 130*b* derive first differences and second differences, respectively, by comparing the derived characteristic quantity distributions between the images picked up with a time interval (S28). The first identification unit 150*a* and the second identification unit 150*b* identify the first regions and the second regions in the range where the derived first differences and second differences, respectively, have values other than zero as the first regions and the second regions where the object is located (S30). The third identification unit 152 recognizes the regions where the object is located by identifying the regions where the first regions identified by the first identification unit 150*a* and the second regions identified by the second identification unit 150*b* overlap each other (S32). The setting unit 170 accumulates a predefined amount of information on overlapping regions identified by the third identification unit 152, sets a part of interest in the picked-up images based on the accumulated information, and inputs the information on the set part of interest to the first division unit 110*a* and the second division unit 110*b* (S34). The display unit 160 displays an image taken by the image pickup unit 102 overlapping with the overlapping regions recognized by the third identification unit 152.

According to the object recognition apparatus 100 described hereinabove, the amount of information can be reduced because the calculation at the first calculation unit 120*a* compresses the image information for each first region as a characteristic quantity distribution along the y axis. Similarly, the amount of information can be reduced because the calculation at the second calculation unit 120*b* compresses the image information for each second region as a characteristic quantity distribution along the x axis. Furthermore, noise can be removed because the characteristic quantities are derived by adding up or averaging the converted values obtained for each pixel by the first calculation unit 120*a* and the second calculation unit 120*b*.

The first comparison unit 130*a* and the second comparison unit 130*b* derive differences of the characteristic quantity distributions themselves between the images picked up with a time interval, so that the comparison can be done with a reduced amount of calculation. In other words, a higher speed can be realized for position recognition. The characteristic quantity distributions are compared in each of two different directions at the first comparison unit 130*a* and the second comparison unit 130*b*, respectively, so that position recognition can be carried out with high accuracy. It is also possible to treat the characteristic quantities at a recognized position as the characteristic quantities of an object. Further, the first division unit 110*a* and the second division unit 110*b* perform a narrower division of the part of interest in an picked-up image, based on the information on the part of interest acquired by the setting unit 170, so that the accuracy of position recognition of the object in the part of interest can be raised. They perform a wider division of the parts other than the part of interest, so that the amount of information can be reduced. And the display unit 160 displays a picked-up image overlapping the regions where the object is located, thus providing an excellent visibility of the object.

Figure 11:
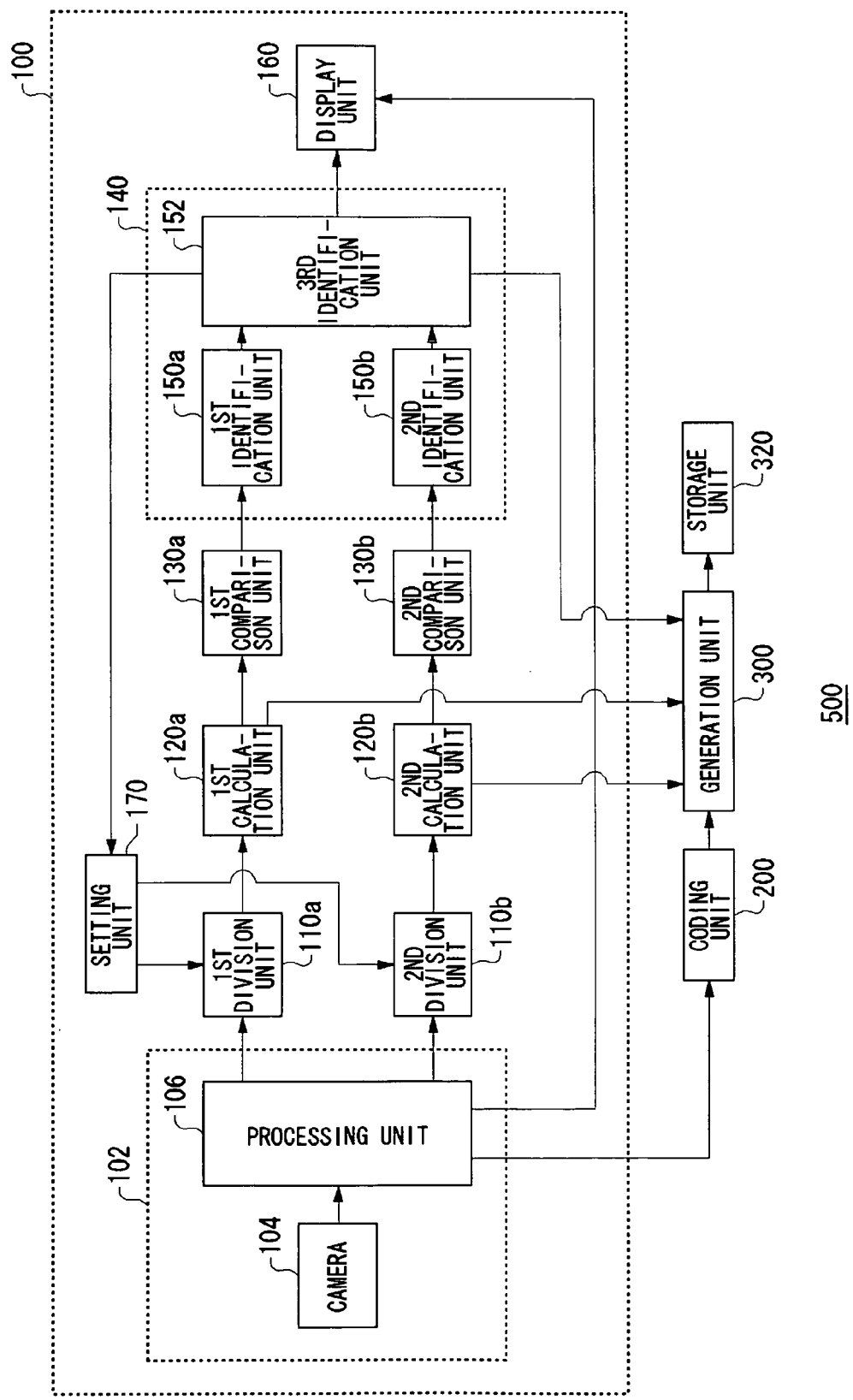
FIG. 11 illustrates a structure of an image processing apparatus as an example of application according to an embodiment.

Moreover, an object recognition apparatus 100 may be applied to and used as an image processing apparatus. An example of such application will be described below. FIG. 11 illustrates a structure of an image processing apparatus 500 as an example of application according to the present embodiment. The image processing apparatus 500 includes an object recognition apparatus 100, a coding unit 200, a generation unit 300 and a storage unit 320. The structure and operation of the object recognition apparatus 100 are as described above. The coding unit 200 codes image data digitized by a processing unit 106, using an coding method complying with the MPEG (Moving Picture Expert Group) standard for instance. The generation unit 300 generates a stream that contains the image data coded by the coding unit 200 and the position data on the overlapping regions identified by a third identification unit 152. The generation unit 300 may generate a stream that further contains the data on the characteristic quantity distributions derived by the first calculation unit 120*a* and the second calculation unit 120*b*. Or in place of the position data, the aforementioned data of characteristic quantity distributions may be included therein. The storage unit 320 stores a streams generated by the generation unit 300.

FIG. 12 illustrates an arrangement of streams generated by the generation unit 300 of FIG. 11. Referring to FIG. 12, A indicates a coded image data. A group of image data A contains data on a plurality of images captured at time intervals. B indicates position data on an overlapping region that the third identification unit 152 has identified among the data on a plurality of images. For instance, if the group of image data A is data on two images superimposed as shown in FIG. 8, an overlapped region will be indicated by $a \leq x \leq b$ and $c \leq y \leq d$. Thus, it is preferable that the position data B contain the coordinates (a, c) and (b, d) or the coordinates (a, d) and (b, c). C indicates data on the distributions of characteristic quantities derived by the first calculation unit 120*a* and the second calculation unit 120*b*. The generation unit 300 may, for example, insert known signals, respectively, among image data, position data and data on the distributions of characteristic quantities, so as to indicate a boundary for each data.

Figure 13:
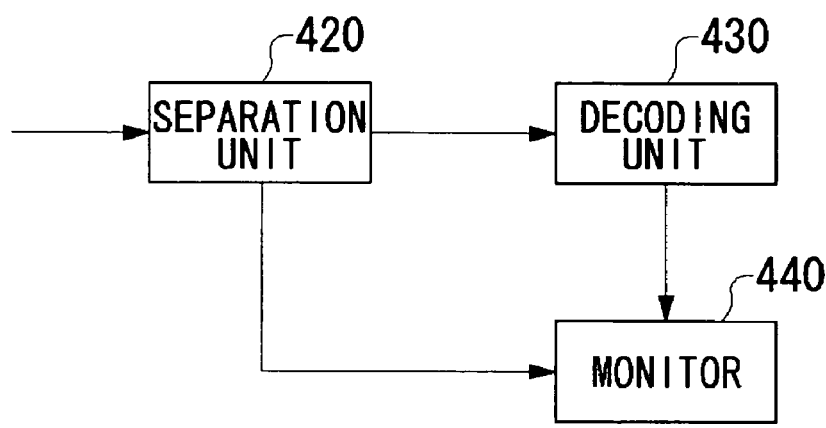
FIG. 13 illustrates a structure of a reproducing apparatus which reproduces and displays the streams shown in FIG. 12.

FIG. 13 illustrates a structure of a reproducing apparatus 550 which reproduces and displays the streams shown in FIG. 12. The reproducing apparatus 550 includes a separation unit 420, a decoding unit 430 and a monitor 440. The streams shown in FIG. 12 are inputted to the separation unit 420. The separation unit 420 separates the inputted streams into image data, position data and data on the distribution of characteristic quantities. As described above, if the known signals are inserted among the image data, the position data and the data on the distribution of characteristic quantities, respectively, the streams can be separated based on the known signals. The decoding unit 430 decodes the thus separated image data, using a decoding method corresponding to the coding method. The monitor 440 displays an image obtained from the decoded image data and a region identified by the position data in a manner such that they are superimposed on each other and the respective coordinates are associated with each other.

According to the above-described example of application, the generation unit 300 generates a stream containing coded image data and position data of the regions where the object is located, and therefore the reproducing apparatus 550 can easily extract an object within an image from the generated stream. Also, because of the capability to search at high speed for the appearance scene of an object or the locus of movement of an object, the image processing apparatus 500 may be used as a monitoring camera, which is capable of searching for a suspicious person from among a large volume of monitoring images.

Figure 14:
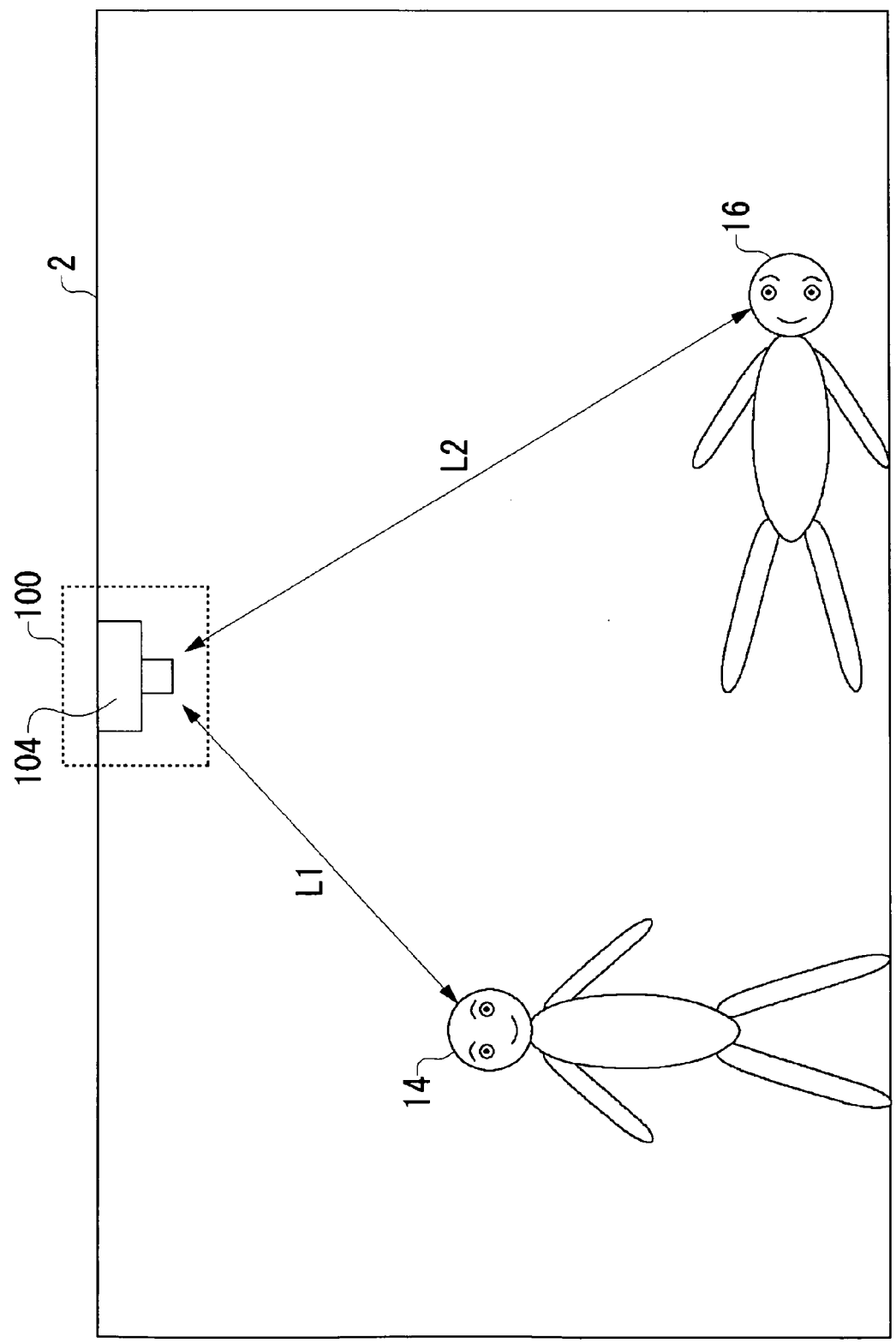
FIG. 14 illustrates a method by which to identify the posture of an object, as an application example of an embodiment.

The camera 104 may pick up a distance image as an image in place of or in addition to a normal image. When a distance image is taken, the object recognition apparatus can recognize not only the position but also the posture of an object by further including a posture identifying unit therein. A description will now be given of an operation of the posture identifying unit. The posture specifying unit, not shown here, is connected with the processing unit 106 and the third identification unit 152 in FIG. 1. The posture identifying unit first acquires the pixel values in an overlapping region identified by the third identification unit 152, from the processing unit 106 and then identifies the distance between the camera 104 and the object. Then the posture of the object is identified based on the identified distance, as will be described later. FIG. 14 illustrates a method by which to identify the posture of an object in a room 2, as an application example of the present embodiment. A camera 104 is placed at the ceiling of a room 2. L1 represents a distance between a camera 104 and an object 14. L2 represents a distance between the camera 104 and an object 16. Note that the camera 104 alone is shown in FIG. 14 and the other parts of the object recognition apparatus 100 are omitted. For example, if the distance identified from a pixel value in the region where the object is located is "farther (greater)" or "nearer (smaller)" than a threshold value Lz, the posture identifying unit will identify that the object is in a "sleeping" posture or "uprising" posture, respectively. In this case, since the distance information is used as an image, the posture of an object can be specified based on the distance information and the information on the position of an object. Accordingly, the applicability of the object recognition apparatus 100 is extended. The object recognition apparatus 100 may be set in the ceiling so as to identify the posture of an object from the image captured by the camera 104. Furthermore, a distance sensor (not shown) may be provided separately from the camera 104, so that the posture identifying unit may identify the distance between the camera 104 and an object, based on the distance information acquired by the distance sensor.

Figure 15:
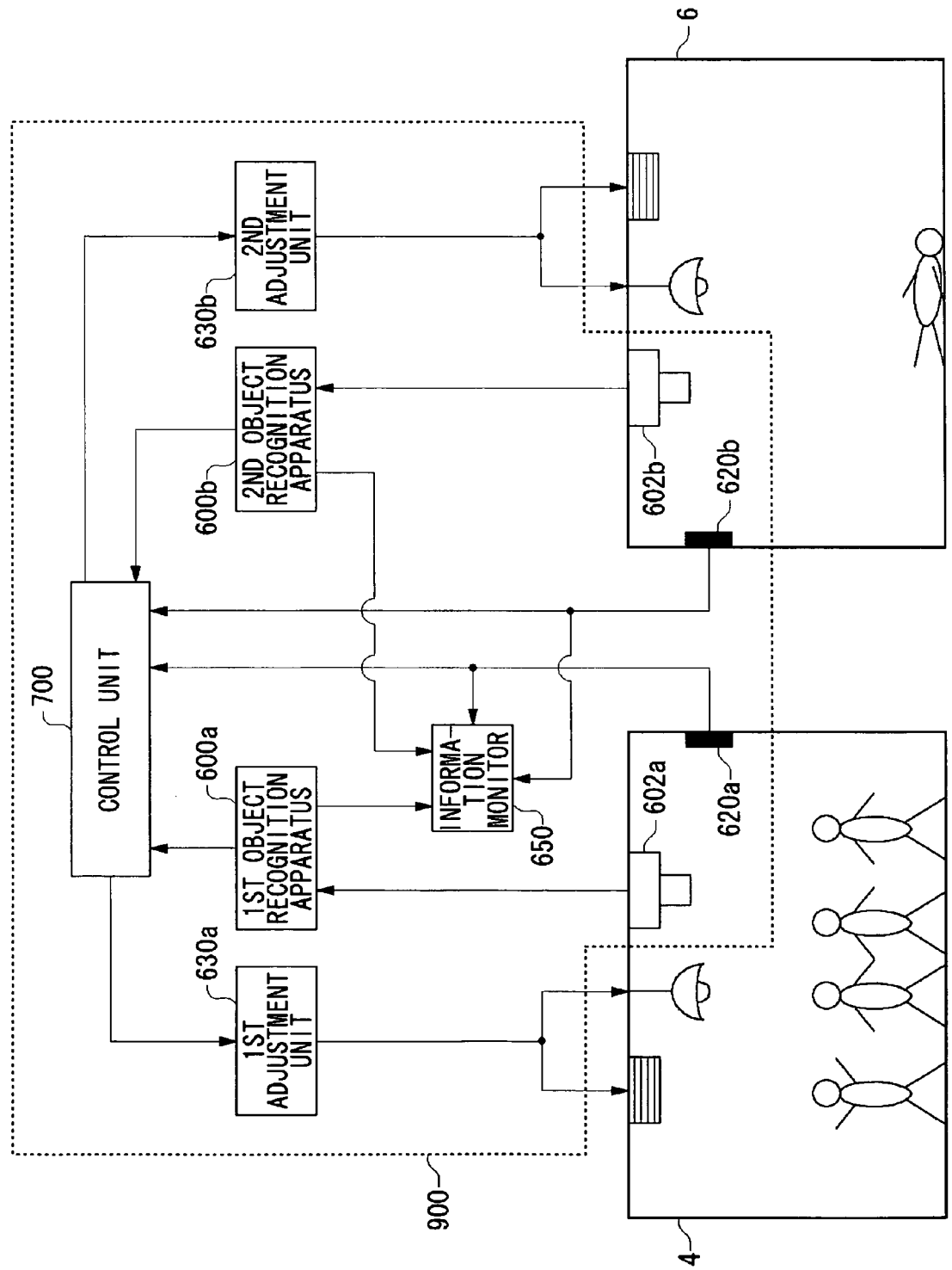
FIG. 15 is a structure of an environment controlling apparatus according to an application example of an embodiment.

In a case when there is provided the posture identifying unit as described above, the object recognition apparatus 100 may be applied as a environment controlling apparatus. Hereinbelow, its application example will be described. FIG. 15 is a structure of an environment controlling apparatus 900 according to an application example of an embodiment. The environment controlling apparatus 900 includes a first object recognition apparatus 600a, a second object recognition apparatus 600b, a first camera 602a, a second camera 602b, a first acquisition unit 620a, a second acquisition unit 620b, a first adjustment unit 630a, a second adjustment unit 630b, an information monitor 650 and a control unit 700. The first object recognition apparatus 600a and the second object recognition apparatus 600b have the same structure as that of the object recognition apparatus 100 described above and therefore the repeated description therefor is omitted here. For the clarity of explanation, the first camera 602a and the second camera 602b are described separately from the first object recognition apparatus 600a and second object recognition apparatus 600b.

Figure 16:
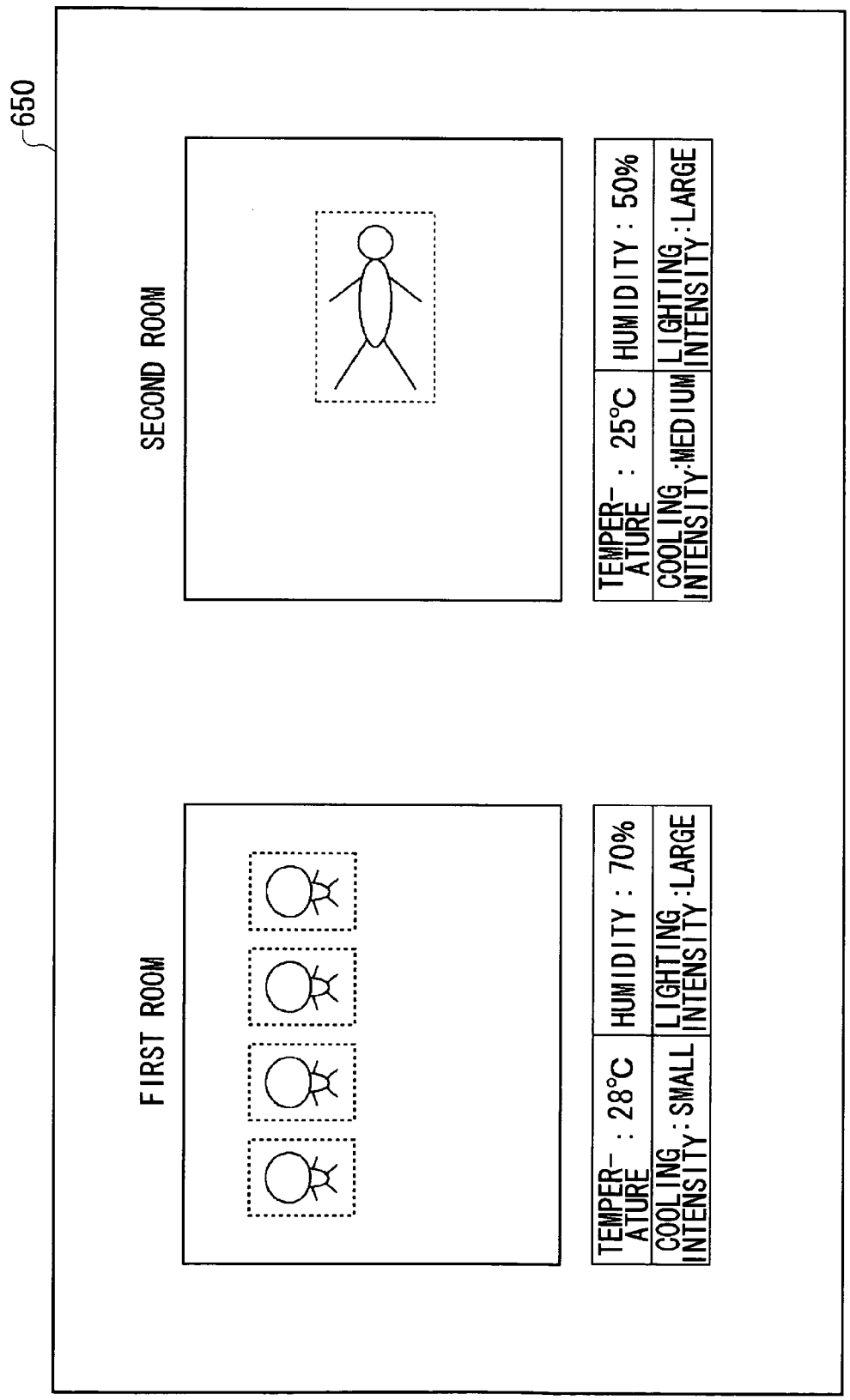
FIG. 16 illustrates an example of display by the information monitor of FIG. 15.

The first object recognition apparatus 600a recognizes the position and posture of an object or objects in a first room 4. The second object recognition apparatus 600b recognizes the position and posture of a person in a second room 6. The first acquisition unit 620a acquires information on environment in the first room 4. The second acquisition unit 620b acquires information on environment in the second room 6. The first acquisition unit 620a and second acquisition unit 620b may be comprised, for example, of a temperature sensor and/or humidity sensor and so forth. The environment information may be the temperature, humidity, illumination intensity, the working situation of home appliances or other information. The first adjustment unit 630a adjusts the environment of the first room 4. The second adjustment unit 630b adjusts the environment of the second room 6. The information monitor 650 displays simultaneously the information on the positions, postures and environments in the first room 4 and second room 6 obtained by the first object recognition apparatus 600a, the first acquisition unit 620a, the second object recognition apparatus 600b and the second acquisition unit 620b, respectively. FIG. 16 illustrates an example of display by the information monitor 650 of FIG. 15. The information monitor 650 displays images, positions of objects, temperatures, humidities, cooling intensities and illumination intensities of the first room 4 and the second room 6, respectively. Now, reference is made back to FIG. 15.

The control unit 700 controls the operations of the first adjustment unit 630a and the second adjustment unit 630b, based on the positions and postures of the objects recognized by the first object recognition apparatus 600a and second object recognition 600b and the environment information acquired by the first acquisition unit 620a and second acquisition unit 620b. For example, when the object is sleeping in the second room 6 and the light is on, the control unit 700 may control the second adjustment unit 630b so that the light can be put out. As shown in FIG. 15, when many objects are present in the first room 4 and a single object is present in the second room 6, the control unit 700 may control the first adjustment unit 630a and the second adjustment unit 630b so that, for example, the cooling intensity of the first room 4 becomes larger than that of the second room 6. The number of objects can be easily known from the number of positions recognized. According to this application example, the relative information on the environments in two different locations is also used and hence the environment at the two difference locations can be controlled. As a result, the environment can be controlled with higher accuracy, as compared with a case where no relative information is used.

The above-described embodiments are merely exemplary and therefore it is understood by those skilled in the art that various modifications to the combination of each component and process thereof are possible and such modifications are also within the scope of the present invention.

According to the embodiments, the object recognition apparatus 100 includes an image pickup unit 102, but this should not be considered as limiting. Necessary images may be acquired from something or somewhere else. Anything will suffice so long as it can input necessary images to the present system. Also, the camera 104 picks up normal images having visible information, such as gray value, brightness and color information, and distance images in which the respective pixel values have distance information, but this feature should not be considered as limiting. The camera 104 may pick up thermal images in which the respective pixel values have thermal information. Further, it may pick up two or more of these images. In other words, the camera 104 may pick up images in which the respective pixel values have gray value, brightness, color information, distance information, thermal information, and/or other local image information. When thermal images are used, it is possible to lessen the effect of brightness of the place where the images are taken. Also, when multiple types of images are taken, there may be some difference between the type of images inputted to the first division unit 110a and the type of images inputted to the second division unit 110b. In such an application, different types of characteristic quantities will be derived from the first calculation unit 120a and the second calculation unit 120b, so that it will be possible to perform position recognition with higher accuracy if the advantages and disadvantages of such different images are properly taken into consideration. It is to be noted here that thermal images can be picked up using an infrared thermography unit for instance. Also, a temperature sensor, such as an infrared sensor, may be provided in addition to the camera 104. The posture identifying unit may identify the temperature of an object, using thermal information acquired by a temperature sensor. The posture of an object may also be identified, based on the regions recognized by the recognition unit 140 and the temperatures identified by the temperature identifying unit.

Figure 17A:
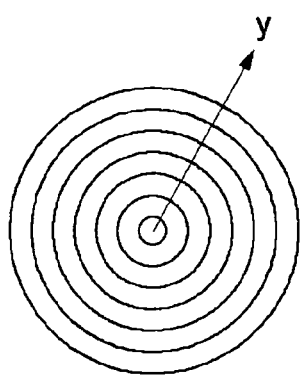
FIGS. 17A to 17E illustrate examples of partition of an image according to a modification.
Figure 17B:
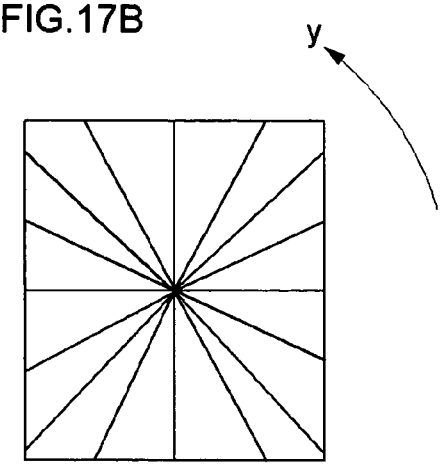
Figure 17C:
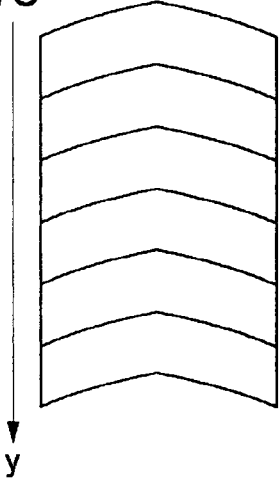
Figure 17D:
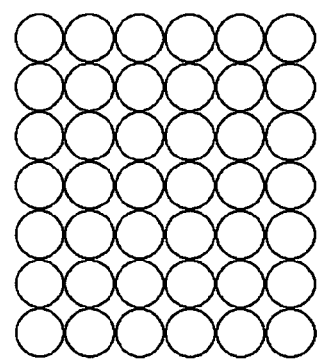
Figure 17E:
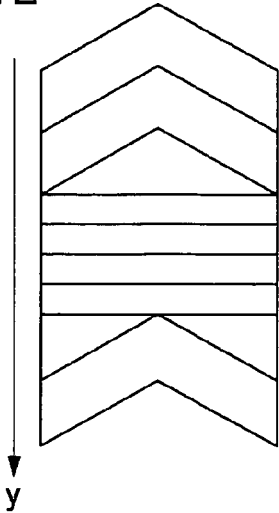

In the embodiment described above, the two different directions selected are the x axis direction and the y axis direction, which are at right angles with each other, but this should not be considered as limiting. The examples of the two different directions are generally a combination selected from among the vertical direction, the horizontal direction, the 45-degree direction and the 135-degree direction or a combination of radial directions and angular directions. Yet, these are not limiting, and the first division unit 110a and the second division unit 110b can partition images into regions along any optional two directions. When an image is partitioned at equal intervals in each of the radial direction and the angular direction, the central part of the image is divided more narrowly than the parts away from the center, so that position recognition with higher accuracy can be achieved by placing the regions with more frequent movements of an object in the central part. Furthermore, the directions of partition are not limited to two different directions. They may be a single direction or three or more directions. Increasing the number of directions of partition may improve the accuracy of position recognition, but may also increase the amount of calculations. Decreasing the number of directions of partition may reduce the amount of calculations, but may lower the accuracy of position recognition. The number of directions of division may be selected appropriately according to the purpose or use of an application. Moreover, the division into regions along a direction should not be considered as limiting. That is, any form of partitioned regions may suffice so long as an image is divided into a plurality of regions. The form of divided regions may be selected appropriately according to the purpose or use of an application. FIGS. 17A to 17E illustrate examples of division of an image in various modifications to the present invention. FIG. 17A shows an example of dividing an image in the radial direction. FIG. 17B shows an example of dividing an image in the angular direction. FIG. 17C shows an example of dividing an image with identical curved lines. FIG. 17D shows an example of dividing an image into circles. FIG. 17E shows an example of dividing an image into curved regions and linear regions.

In the embodiments described above, the first division unit 110a partitions an image into a plurality of first regions of the same shape, but it is not necessary that the plurality of first regions be of the same shape. The same is true of the plurality of second regions in FIG. 3.

In the embodiment described above, a characteristic quantity is derived for each of the regions based on the gradient vector at each pixel, but this should not be considered as limiting. The first calculation unit 120a and the second calculation unit 120b may derive the characteristic quantity for each region by adding up, multiplying or averaging the pixel values themselves. By doing so, the amount of calculations can be reduced. The first calculation unit 120a may derive the characteristic quantity for each region based on the gradient vector at each pixel, whereas the second calculation unit 120b may derive the characteristic quantity for each region based on each pixel value. Or vice versa. The types of characteristic quantities to be derived by the first calculation unit 120a and the second calculation unit 120b may be selected appropriately according to the purpose or use of an application.

In the embodiments described above, the images containing an object, which have been picked up with a time interval, are compared, but this should not be considered as limiting. The first comparison unit 130a and the second comparison unit 130b may compare an image containing no object and an image containing an object, which are picked up with a time interval. In this manner, too, it is possible to recognize the position of the object.

While the preferred embodiments of the present invention have been described using specific terms, such description is for illustrative purposes only, and it is to be understood that changes and variations may be further made without departing from the spirit or scope of the appended claims.

What is claimed is:

1. An object recognition apparatus, including:
   an input unit which inputs at least two images that contain a captured position where an object is possibly present;
   a first division unit which partitions each of the at least two entire images into a plurality of first regions along a first direction;
   a second division unit which partitions each of the at least two entire images into a plurality of second regions along a second direction different from the first direction;
   a first calculation unit which derives, for each of the plurality of first regions partitioned by said first division unit, a first characteristic quantity of the region based on a pixel value of each pixel within the first region;
   a second calculation unit which derives, for each of the plurality of second regions partitioned by said second division unit, a second characteristic quantity of the region based on a pixel value of each pixel within the second region;
   a first comparison unit which compares the first characteristic quantities derived by said first calculation unit between the at least two images, for each of the plurality of first regions;
   a second comparison unit which compares the second characteristic quantities derived by said second calculation unit between the at least two images, for each of the plurality of second regions; and
   a recognition unit which recognizes a region where the object is located, based on a comparison result by said first comparison unit and said second comparison unit for the each first and the each second region,
   wherein said recognition unit including:
   a first identification unit which identifies from the plurality of first regions a first region where the object should be located, based on the comparison result by said first comparison unit for each of the plurality of first regions;
   a second identification unit which identifies from the plurality of second regions a second region where the object should be located, based on the comparison result by said second comparison unit for each of the plurality of second regions; and
   a third identification unit which recognizes a region where the object is located, by identifying a range in which the first region identified by the first identification unit is superposed with the second region identified by the second identification unit.

2. An object recognition apparatus according to claim 1, further including a display unit which displays the image inputted by said input unit in such a manner that the region recognized by the third identification unit is superposed on the image.

3. An object recognition apparatus according to claim 1, further including a setting unit which sets a marked-out part in a captured image, based on the region, where the object is located, recognized by said recognition unit, wherein said division unit partitions an image inputted after the marked-out part has been set by said setting unit, in a manner such that the marked-out part set by said setting unit is partitioned narrowly and parts other than the marked-out part are partitioned widely.

4. An object recognition apparatus according to claim 1, further including:

a distance information acquisition unit which acquires distance information in the region, where the object is located, recognized by said recognition unit; and a distance identifying unit which identifies a distance of the object based on the distance information acquired by said distance information acquisition unit.

5. An object recognition apparatus according to claim 1, wherein the image inputted in said input unit is a distance image each pixel of which indicates distance information, the apparatus further including a distance identifying unit which identifies a distance of the object based on the distance information on the region recognized by said recognition unit.

6. An object recognition apparatus according to claim 1, further including:

a thermal information acquiring unit which acquires thermal information in the region recognized by said recognition unit; and a temperature identifying unit which identifies a temperature of the object based on the thermal information acquired by said thermal information unit.

7. An object recognition apparatus according to claim 1, wherein the images inputted in said input unit are thermal images where each pixel value indicates thermal information, the apparatus further including a temperature identifying unit which identifies the temperature of the object based on the thermal information in the region recognized in said recognition unit.

8. An object recognition apparatus according to claim 4, further including a posture identifying unit which identifies a posture of the object based on the region recognized by said recognition unit and the distance identified by said distance identifying unit.

9. An object recognition apparatus according to claim 6, further including a posture identifying unit which identifies the posture of the object based on the region recognized in said recognition unit and the temperature identified by said temperature identifying unit.

10. An image processing apparatus, including:

an input unit which sequentially inputs an image where a position at which an object is possibly present is captured;

a position identifying unit which identifies a region where the object is located in the image inputted in said input unit;

a coding unit which codes data of the image inputted and digitized into a predetermined value in said input unit;

a generation unit which generates a stream that contains the image data coded in said coding unit and data on the region, where the object is located, identified by said position identifying unit;

wherein said position identifying unit includes an object recognition apparatus according to claim 1.

* * * * *